United States Patent
Kamada et al.

(10) Patent No.: US 7,275,072 B2
(45) Date of Patent: Sep. 25, 2007

(54) DATA PROCESSING SYSTEM AND METHOD WITH DATA SHARING FOR THE SAME

(75) Inventors: Yasuhiro Kamada, Yokohama (JP); Nobuo Kawamura, Atsugi (JP); Junko Katsumata, Yokohama (JP); Kota Yamaguchi, Yamato (JP); Keisuke Toda, Sagamihara (JP)

(73) Assignees: Hitachi, Ltd., Tokyo (JP); Hitachi Software Engineering Co., Ltd., Yokohama-Shi (JP)

( * ) Notice: Subject to any disclaimer, the term of this patent is extended or adjusted under 35 U.S.C. 154(b) by 142 days.

(21) Appl. No.: 10/930,765

(22) Filed: Sep. 1, 2004

(65) Prior Publication Data
US 2005/0278387 A1    Dec. 15, 2005

(30) Foreign Application Priority Data
May 27, 2004    (JP)    ............... 2004-157619

(51) Int. Cl.
G06F 7/00     (2006.01)
G06F 17/00    (2006.01)
G06F 12/00    (2006.01)
G06F 17/30    (2006.01)

(52) U.S. Cl. .............. 707/200; 707/204; 707/205; 707/100

(58) Field of Classification Search ............ 707/200, 707/1, 205, 2, 3, 4, 202, 204, 100
See application file for complete search history.

(56) References Cited

U.S. PATENT DOCUMENTS

| | | | |
|---|---|---|---|
| 5,860,137 A * | 1/1999 | Raz et al. .................. 711/202 |
| 6,173,306 B1 * | 1/2001 | Raz et al. .................. 718/102 |
| 6,321,238 B1 | 11/2001 | Putzolu | |
| 6,845,384 B2 * | 1/2005 | Bamford et al. ............ 707/205 |
| 6,910,101 B2 | 6/2005 | Obara et al. | |
| 2004/0215639 A1 * | 10/2004 | Bamford et al. ............ 707/100 |
| 2004/0215640 A1 * | 10/2004 | Bamford et al. ............ 707/100 |
| 2004/0215883 A1 * | 10/2004 | Bamford et al. ............ 711/129 |
| 2005/0027719 A1 * | 2/2005 | Maciel et al. ............... 707/100 |
| 2005/0131893 A1 | 6/2005 | Von Glan | |
| 2005/0262045 A1 * | 11/2005 | Tsuchida et al. ............... 707/2 |

OTHER PUBLICATIONS

DeMel, Sohan, "Oracle9I Real Application Clusters—Cache Fusion Delivers Scalability," Oracle White Paper, Oracle Corporation, May 2001, pp. 1-24; USA.

* cited by examiner

*Primary Examiner*—John Cottingham
*Assistant Examiner*—Michael D Pham
(74) *Attorney, Agent, or Firm*—Antonelli, Terry, Stout & Kraus, LLP.

(57) ABSTRACT

If relocation of a table with a high reference frequency is made possible, the database management method and system are arranged to improve performance according to the number of increased nodes and accumulate a reference frequency of each external storage unit allocated to each database management node. A data storage area for storing the table with a high reference frequency, located in the external storage unit, is specified as a shared data area to be referenced by plural nodes. The system is controlled to cause the nodes to refer to the shared table stored in the shared data area on any timing in parallel. This prevents load from being concentrated onto the node allocated to the data area.

4 Claims, 10 Drawing Sheets

FIG.2

TABLE INFORMATION 11

| TABLE NAME (13) | SHARED TABLE ? (14) | ALLOCATED DATABASE MANAGEMENT NODE (15) | REFERENCE-PERMITTED DATABASE MANAGEMENT NODE (16) |
|---|---|---|---|
| TABLE B | NO | DATABASE MANAGEMENT NODE B | DATABASE MANAGEMENT NODE B |
| TABLE C | YES | DATABASE MANAGEMENT NODE C | DATABASE MANAGEMENT NODE C |
| TABLE D | NO | DATABASE MANAGEMENT NODE D | DATABASE MANAGEMENT NODE D |

# DATA PROCESSING SYSTEM AND METHOD WITH DATA SHARING FOR THE SAME

CROSS-REFERENCE TO RELATED APPLICATION

The present application claims priority from Japanese application JP2004-157619 filed on May 27, 2004, the content of which is hereby incorporated by reference into this application.

BACKGROUND OF THE INVENTION

The present invention relates to a data processing system and method which are arranged to keep loads at data processing nodes well-balanced as much as possible.

As a method of accessing data in a database system composed of plural nodes, conventionally, two methods, that is, a shared database approach and a shared nothing database approach are disclosed in Sohan DeMel, "Oracle9i Real Application Clusters—Cache Fusion Delivers Scalability," Oracle White Paper, Oracle Corporation, pages 7 to 9 and 12 to 13, May 2001.

The shared database approach method is arranged to allow each of the nodes to evenly make access to all data. Hence, this method makes it possible to uniformly distribute load among the nodes. This method, however, requires synchronous update among the nodes, which brings about overheads such as an I/O process of reading data again and an inter-node communication for synchronous control.

On the other hand, the shared nothing database approach method permits each of the nodes to make access to only a data area allocated to each node itself. Hence, if the data location is shifted, the load is focused on one or some nodes. However, this method does not require the synchronous control among the nodes, so that the nodes may be operated in parallel.

SUMMARY OF THE INVENTION

Both of the foregoing conventional methods allow the load burdened to the nodes to be distributed by increasing the nodes in number, for the purpose of improving the performance. However, the shared database approach method involves a disadvantage that the performance of the net increased nodes cannot be improved because the overhead is increased with the increase of the nodes. Further, the shared nothing database approach method also requires proper relocation of data according to the number of the increased nodes. In actual, however, if the table with a high reference frequency cannot be relocated by the division or the like, the load is concentrated on the node where that table with a high reference frequency is located. It means that it is impossible to improve the performance according to the number of the increased nodes. This is the disadvantage of the latter method.

The foregoing problem involved by the shared database approach method may be solved by the following method. That is, if two or more nodes make access to the same data, the transfer of the data from a cache of the node to be synchronized to a cache of another node results in eliminating the necessity of the quite costly I/O process, thereby suppressing the increase of the overhead.

However, up to date, the foregoing problem involved by the shared nothing database approach method cannot be solved by any effective means.

It is therefore an object of the present invention to keep the loads at plural database processing nodes well-balanced as much as possible.

According to an aspect of the present invention, in carrying out the object, a method for managing a database arranged so that each of the database management nodes may make access to only a table in a data area allocated to the accessing node itself, characterized in that a table with a high reference frequency, selected from the tables of the data areas allocated to those nodes, may be specified as a shared table to be referenced by those database management nodes.

The present invention is effective in keeping the load at the database management nodes well-balanced as much as possible.

BRIEF DESCRIPTION OF THE DRAWINGS

FIG. 2 is a view showing a composition of table information;

DESCRIPTION OF THE EMBODIMENTS

Hereafter, the embodiments of the database management method and system according to the present invention will be described in detail with reference to the appended drawings.

Figure 1:
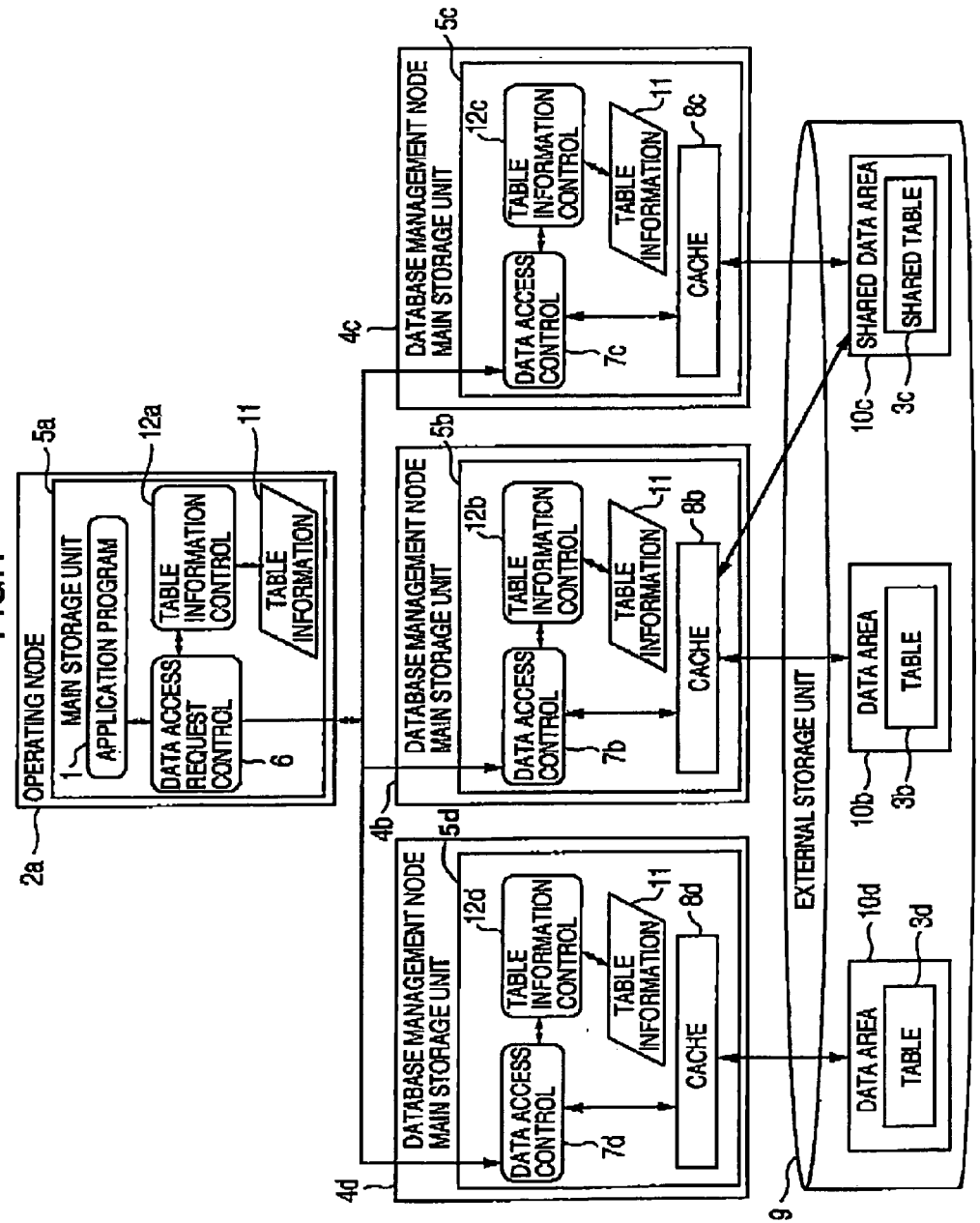
FIG. 1 is a block diagram showing an arrangement of a database system according to a first embodiment of the present invention.

FIG. 1 is a block diagram showing an exemplary arrangement of a database system according to a first embodiment of the present invention. In FIG. 1, a reference number 1 denotes an application program (including a business program and an object, a process or a thread realizing the function of the program). A reference number 2a denotes an operating or application or control node. Reference numbers 3b to 3d denote tables. Reference numbers 4b to 4d denote database management nodes. Reference numbers 5a to 5d denote main storage units. A reference number 6 denotes a data access request control unit (that may be realized by a program, or an object, a process or a thread for realizing the function of the program, or hardware). Reference numbers 7b to 7d denote data access control units (that may be realized by a program, or an object, a process or a thread for realizing the function of the program, or hardware), Reference numbers 8b to 8d denote cache memories (simply referred to as caches). A reference number 9 denotes an external storage unit. Reference numbers 10b to 10d denote data areas (that may be referred also to as a data saving area or a data storage area). A reference number 11 denotes table information. Reference numbers 12a to 12d denote table information control units (that may be realized by a program, or an object, a process or a thread for realizing the function of the program, or hardware). In the database system to be described as the first embodiment of the present invention, in principle, each of the database management nodes may make access to a data area (for storing a database) allocated to the accessing node itself but may not make access to any data area allocated to any other node. In general, it is a database management system called a shared nothing database approach.

The database system according to the first embodiment of the present invention includes the operating node 2a that executes the application program 1, a plurality of data areas 10b to 10d, the external storage unit 9 in which the tables 3b to 3d composing the database are stored in the data areas respectively, and a plurality of database management nodes 4b to 4d that make access to the tables 3b to 3d by executing the application program 1. In this embodiment, the divisional parts of the database are called the tables. They may be referred to as a partial table, a partial database, a divisional table, a divisional database, or the like. Moreover, the database may be simply called a table. The operating node 2a includes the application program 1 in the main storage unit 5a inside the node 2a itself and the data access request control unit 6 that accepts a request from the application program 1 and distributes a data access request into a proper one of the database management nodes 4b to 4d. In this embodiment, the operating node 2a or the database management nodes 4b to 4d may be realized by an information processing apparatus, a logical server, a program, an object, a process, a thread, or a hardware unit. Further, the database management nodes 4b to 4d may be realized by a database management program or a database management apparatus. The data access control units 7b to 7d may be realized by a program, an object, a process, a thread, or a hardware unit.

The database management nodes 4b to 4d include data access control units 7b to 7d, each of which accepts the request from the data access request control unit 6 of the operating node 2a on the corresponding one of the main storage units 5b to 5d and makes access to the corresponding one of the tables 3b to 3d allocated to the node 2a itself. The data access control units 7b to 7d make access to the tables 3b to 3d through the caches 8b to 8d and then hold the read data on the cache 8b to 8d, respectively. The data areas 10b to 10d properly partitioned on the external storage unit 9 correspond with the database management nodes 4b to 4d, respectively. These data areas 10b to 10d may be referred by all the database management nodes 4b to 4d. On each of the data areas 10b to 10d is created the corresponding one of the tables 3b to 3d, all of which compose the database. The tables 3b to 3d are permitted to be accessed by only the database management nodes 4b to 4d to which the created data areas 10b to 10 are allocated respectively.

In the first embodiment of the present invention, the data area allocated to any database management node may be specified as a shared data area that permits reference from any other database management node. However, only the database management node to which the data area is allocated is permitted to update the data. In the first embodiment of the invention as shown in FIG. 1, the data area 10c allocated to the database is specified as the shared data area, which may be referred by the database management node 4b. The data area 10c specified as the shared data area is a data area in which the table with a high reference frequency is created. The table is specified as the shared table. In the embodiment shown in FIG. 1, the table 3c is specified as the shared table. Then, on each of the main storage units 5a to 5d of all the nodes is created table information that includes the information as to whether or not each table is the shared table, the database management node allocated thereto, and the reference-permitted database management node(s). In the main storage units 5a to 5d, the table information control units 12a to 12d are provided for accessing the table information.

In the foregoing first embodiment of the present invention, the operating node 2a and the database management nodes 4b to 4d may be the ordinary information processing apparatus such as well-known workstations or PCs each provided with a CPU (not shown). Then, the execution of the program through the CPU makes it possible to compose various kinds of function units (to be discussed below) required by this embodiment of the invention. Further, the operating node 2a and the database management nodes 4b to 4d or the database management nodes 4b to 4d may be totally assumed as the virtual computer and built in the computer system composed by one hardware unit. This holds true to the other embodiments of the invention to be discussed below.

FIG. 2 shows an exemplary composition of the table information 11. The table information 11 includes a table name 13 positioned as a key, an information item 14 as to whether or not the table is the shared table, an information item 15 of the allocated database management node, and an information item 16 as to the database management node(s) to be referenced.

Figure 3:
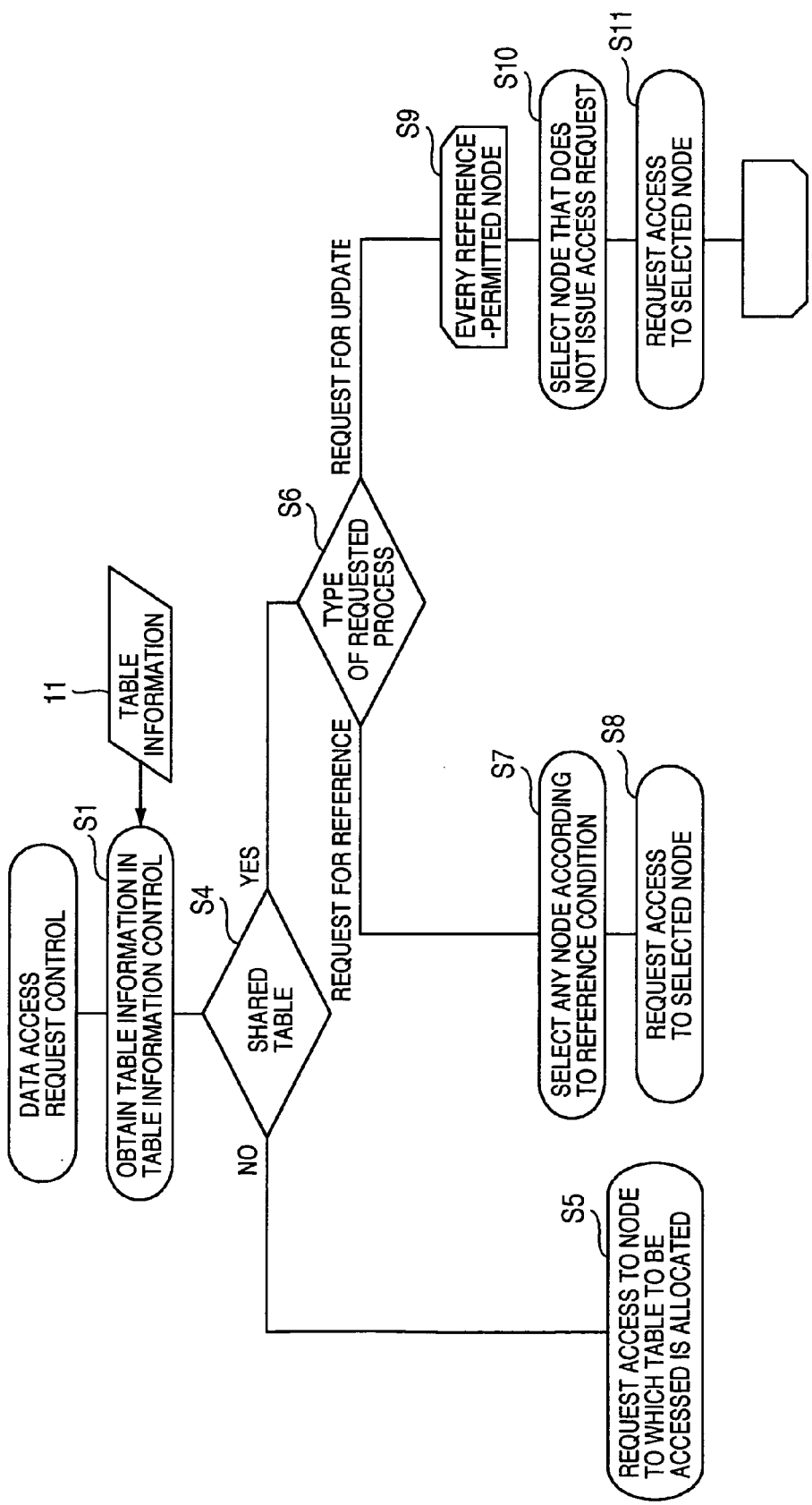
FIG. 3 is a flowchart for illustrating a processing operation of an operating or application or control node included in the first embodiment of the present invention.

FIG. 3 is a flowchart for illustrating the processing operation of the operating node in the first embodiment of the present invention. This processing operation will be described below.

(1) In the operating node 2, when the application program 1 requests a database access from the data access request control unit 6, the data access request control unit 6 performs a data access request control process, requests the table 11 of the target table from the table information control unit 12a, and obtains the table information 11 (step S1).

(2) The data access request control unit 6 determines whether or not the target table is the shared table based on the obtained table information 11 and, if not, issues an access request to the data access control unit of the allocated database management node (steps S4 and S5).

(3) If the target table is the shared table in the determination of the step S4, the data access request control unit 6 determines if the type of the process to be requested is a reference or an update. If it is the request for reference, the data access request control unit 6 selects any database management node matched to the condition of the request for reference from the database management nodes to be referenced, for the case shown in FIG. 1, the database management node 4b or 4c, and issues a request of an access for reference to the data access control unit of the selected database management node (steps S6 to S8).

(4) If the type of request is a request for update in the determination of the step S6, the data access request control unit 6 loops all the database management nodes to be referenced, selects the database management node having issued no access request, and then issues a request of an access for update to the data access control unit 7 of the selected database management node (steps S9 to S11).

Figure 4:
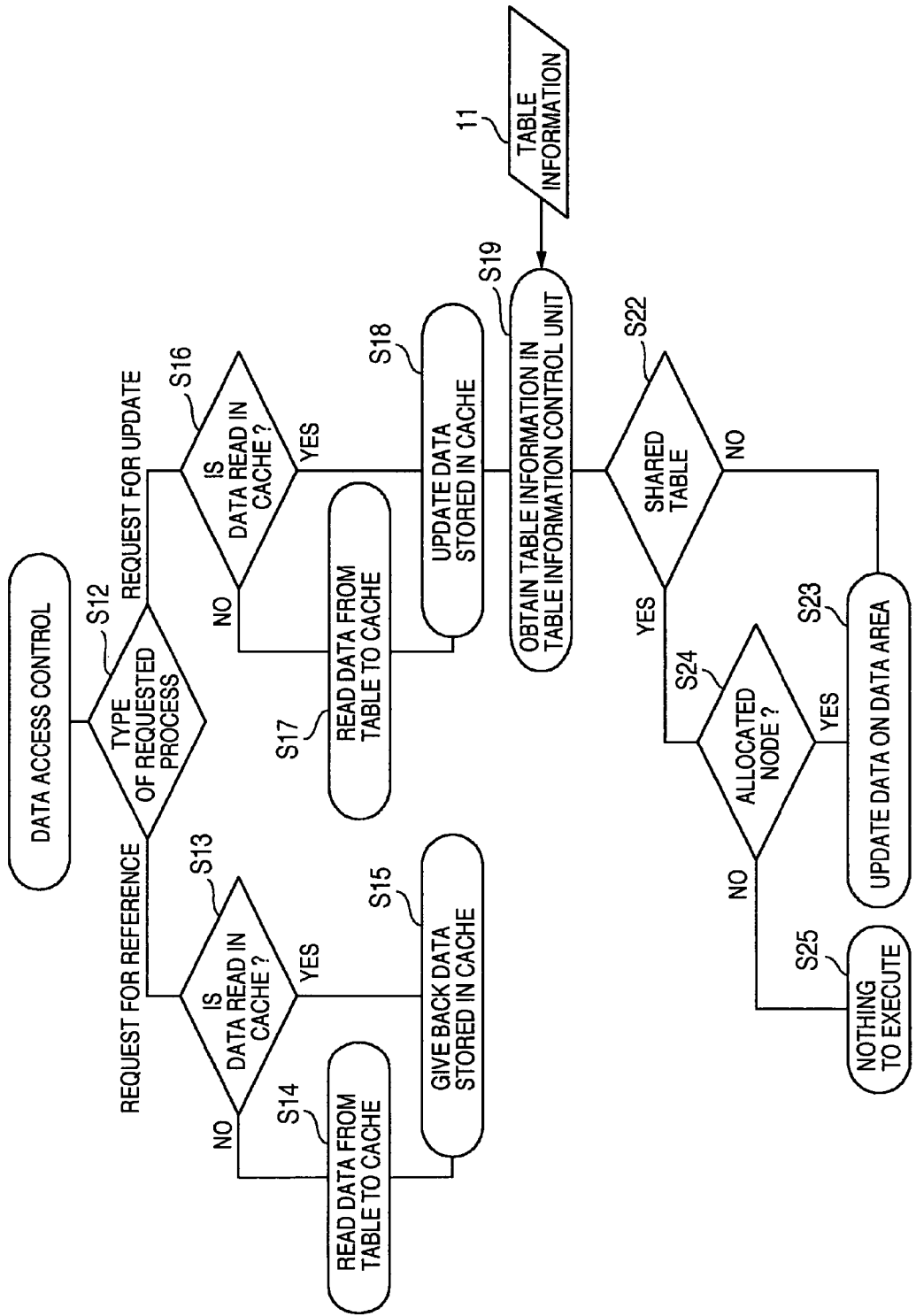
FIG. 4 is a flowchart for illustrating a processing operation of a database management node included in the first embodiment of the present invention.

FIG. 4 is a flowchart for illustrating the processing operation of the database management node included in the first embodiment of the present invention. Then, this processing operation will be described below. The process to be described is a process having been described with reference to FIG. 3, that is, a process of the database management node having accepted the access request.

(1) The data access control unit of the database management node that has been requested to be accessed performs a data access control process. At first, it is determined if the type of the requested process is a reference or an update (step S12).

(2) If the type of the requested process is a request for reference in the determination of the step S12, the data access request control unit determines whether or not the data requested for the cache of the node to which the unit belongs has been already read in the cache. If the requested data has been already read in the cache, the data access request control unit gives back the result based on the read data to the requester (steps S13 and S15).

(3) If the data requested for the cache has not been read in the cache in the determination of the step S13, the data access request control unit reads the data requested for the cache from the target table or the shared table and saves the data in the cache. Then, the control unit gives back the result based on the saved data to the requester (steps S14 and S15).

(4) If the type of the requested process is a request for update in the determination of the step S12, the data access request control unit determines if the data requested to be updated has been already read in the cache. If the data requested to be updated has been already read in the cache, the requested update is reflected on the data saved in the cache (steps S16 and S18).

(5) If the data requested to be updated has not been read in the cache in the determination of the step S16, the data access request control unit reads the data requested to be updated from the target table or the shared table and saves the data in the cache. The requested update is reflected on the data saved in the cache (steps S17 and S18).

(6) In succession, the data access request control unit requests the table information 11 of the target table from the table information control unit 12 and then obtains the table information 11 (step S19).

(7) The data access control unit determines whether or not the target table is the shared table based on the obtained table information. If it is not the shared table, the data updated in the cache is outputted to the table of the data area (steps S22 and S23).

(8) If the target table is the shared table in the determination of the step S22, the data access request control unit determines whether or not the database management node to which the control unit belongs is the database management node to which the shared data area is allocated (step S24).

(9) If it is the database management node to which the shared data area is allocated in the determination of the step S24, the data updated in the cache is outputted to the shared data area. If it is not, nothing is executed (steps S23 and S25).

According to the first embodiment of the present invention, by executing the foregoing process, in the case of requesting reference to the shared table, the operating node enables to distribute the request into the data access control unit of any database management node in the processes of the steps S7 and S8. If the shared table is a table to be frequently referenced, this process allows the process of reference to be executed from any database management node permitted to refer to the shared table. This prevents the process from being concentrated on the specific database management node.

In a case that the shared table is required to be updated, by issuing an update to the data access control unit of every database management node permitted to refer to the shared table through the processes of the steps S9, S10 and S11, the operation is executed to update the data stored in the shared table of the shared data area and the data stored in the cache of every database management node permitted to refer to the shared table.

For the database of the shared database approach, only the cache of the node having executed the update is updated. Hence, if the reference is given from another node, an I/O process takes place for reading the data from the disk again. In this case, in order to guarantee no node being updated for the purpose of preventing the read of the data being updated, the inter-node communication for synchronous control takes place. That is, the database of the shared database approach brings about various kinds of overheads when the plural nodes make access to the same table.

As will be understood from the above description, the database management method and system according to the first embodiment of the invention are arranged to constantly reflect all the update requests onto the data of the cache of every database management node permitted to refer to the shared table, eliminate the necessity of reading the data from the disk again, and prevent occurrence of any I/O process. Moreover, for preventing the read of the data being updated, the method and system are merely required to guarantee that the database management node required to be referenced is not being updated. This guarantee thus does not depend on the state of any other database management node. It means that no inter-node communication for synchronous control takes place.

As such, the database management method and system according to the first embodiment of the invention allow plural database management nodes to make access to the shared table without any overhead. This makes it possible for the database management nodes to refer to and update the data in parallel only if the new database management node(s) are added to the reference-permitted node(s) for improving the performance. It results in no increase of overhead, thereby improving the corresponding performance with the increased number of the database management nodes.

Figure 5:
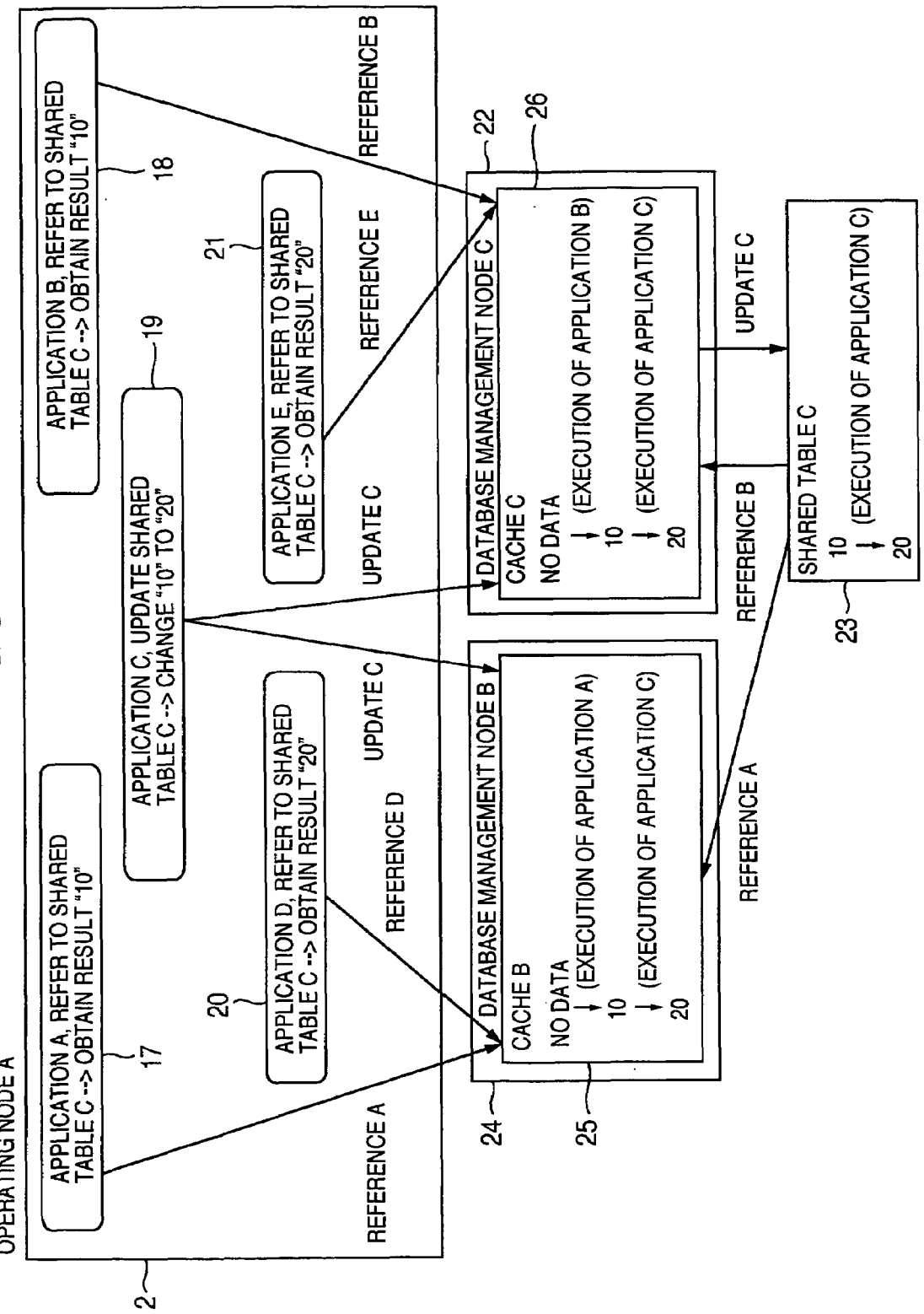
FIG. 5 is an explanatory view showing an executing process of the application included in the first embodiment of the present invention.

FIG. 5 is a view for explaining the execution of the application program (simply referred to as the application) in the aforementioned first embodiment of the present invention. In turn, the concrete process having been described with reference to FIGS. 1 to 4 will be described with reference to FIG. 5.

It is assumed that an application a17, an application b18, an application c19, an application d20, and an application e21 are executed in the operating node 2a. The applications a17, b18, d20 and e21 are executed to refer to the shared table c23 allocated to the database management node c22. The application c19 is executed to update the data of the shared table c23 into "20". The shared table c23 permits the database management nodes b24 and c22 to refer to the table c23 itself. Before executing the foregoing applications, the data "10" is entered into the shared table c23 but is not still read into the cache memories b25 and c26 provided in the database management nodes b24 and c22 respectively.

At first, it is assumed that the applications a17 and b18 are executed in succession so that the request for reference given by the application a17 is distributed into the database management node b24 and the request for reference given by the application b18 is distributed into the database management node. In this case, the request for reference given by the application a17 causes the data "10" to be read into the cache b25 of the database management node b24 and the result to be given back to the application a17 itself. In parallel to this process, the request for reference given by the application b18 causes the data "10" to be read into the cache c26 of the database management node c22 and the result to be given back to the application b18. Afterwards, if the application for referring to the shared table c22 is executed, the data "10" stored in the cache of any distributed database management node is given back to that node itself.

Afterwards, the application c19 is executed to issue a request for changing the data of the shared table c23 from "10" into "20", when the operating node 2a issues a request for update to both of the database management nodes b24 and c22. The database management node b24 updates the data stored in the cache b25 from "10" to "20". Further, the database management node c22 updates the data stored in the cache c26 from "10" into "20" and then outputs the updated data into the shared table c23. As described above, the data stored in the cache of every database management node is updated.

Then, it is assumed that the applications d20 and e21 are executed in succession, the request for reference given by the application d20 is distributed into the database management node b24, and the request for reference given by the application e21 is distributed into the database management node c22. In this case, the data "20" stored in the cache b25 of the database management node b24 is given back to the request for reference given by the application d20. In parallel to this process, the data "20" stored in the cache c26 of the database management node c22 is given back to the request for reference given by the application e21. If the application for referring to the shared table c23 is executed subsequently to the above, the data "20" stored in the cache of any distributed database management node is given back to that application.

As has been understood from the foregoing description, according to the first embodiment of the invention, if the application for updating the shared table is executed while the application for referring to the shared table c23 is executed repetitively, the operation is executed to update the data stored in the cache of every database management node during the execution of each application. Hence, even if the application having issued the request for reference is distributed into any database management node, the proper data may be given back to that application without having to execute the synchronous control with the update at another database management node and read the data again.

According to the foregoing first embodiment of the present invention, the data management system and method are arranged to store the tables 3b to 3d in the data areas 10b to 10d located on the external storage unit 9 respectively and read the data in the caches 8b to 8d of the database management nodes 4b to 4d respectively. The database system of the first embodiment arranged as described above makes it possible for plural database management nodes to refer to the shared table 3c. Then, the read data is saved in the cache of every data management node permitted to refer to the shared table 3c.

In the first embodiment of the present invention, therefore, in the case of updating the data for synchronous control between the database management nodes, it is necessary to update the data stored in the cache of every database management node permitted to refer to the shared table 3c to be updated through the processes of the steps S9 to S11 shown in FIG. 3 and of the steps S16 to S18 shown in FIG. 4. Further, also in the first embodiment, it is necessary to control the database management node 4 for actually updating the shared table 3c located on the external storage unit 9 through the processes of the steps S19 to S25 shown in FIG. 4.

Figure 6:
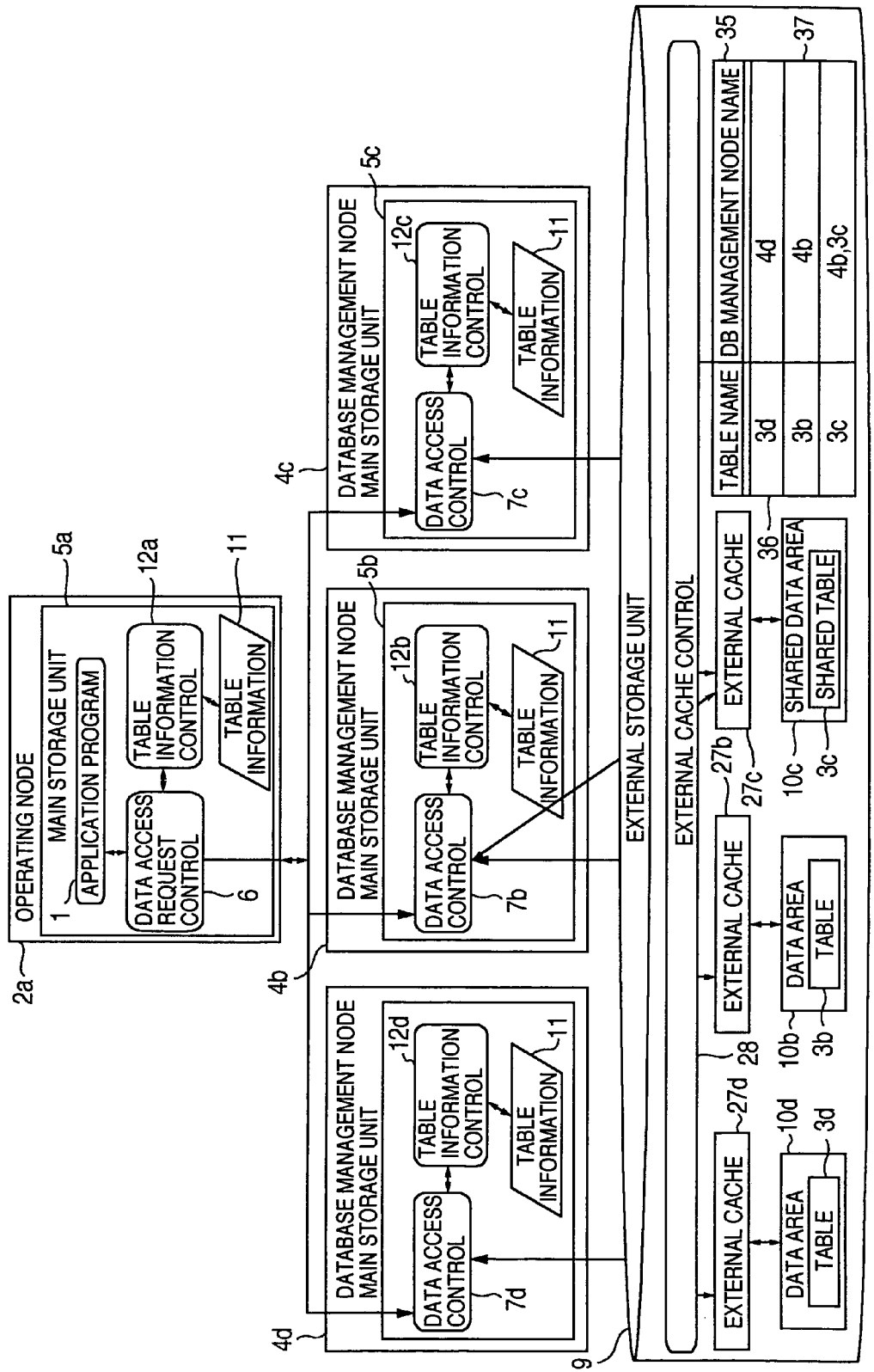
FIG. 6 is a block diagram showing an arrangement of a database system according to a second embodiment of the present invention.

FIG. 6 is a block diagram showing an exemplary arrangement of the database system according to the second embodiment of the present invention. In FIG. 6, reference numbers 27b to 27d denote caches of an external storage unit. A reference number 28 denotes a cache control unit of the external storage unit. The other reference numbers denote the same components as those shown in FIG. 1. The database system according to the below-described second embodiment of the present invention is arranged to eliminate the necessity of the synchronous control between the database management nodes in the foregoing first embodiment of the present invention.

The second embodiment shown in FIG. 6 is different from the first embodiment in location of the caches 27b to 27d in the external storage unit 9 in place of the cache located in each database management unit as in the first embodiment and in provision of new table information 35 having a table name 35 and a database management node name 37 for managing the correspondence between the table. The other arrangement of the second embodiment is the same as that of the first embodiment.

The external storage unit cache memories 27b to 27d (simply referred to as the external caches) located in the external storage unit are allocated to the data areas 10b to 10d respectively. The external cache control unit 28 manages the allocating correspondence between the external cache memories 27b to 27d and the data areas 10b to 10d and refers to or updates the data of the proper external caches 27b to 27d to the data areas 10b to 10d requested to be referenced or updated by the database management nodes 4b to 4d. Further, on the predetermined occasion, the external cache control unit 28 reflects the data updated by the external cache memories 27b to 27d onto the data areas 10b to 10d allocated to those caches 27b to 27 respectively. The predetermined occasion indicates the times such as when the updated data of each of the external cache memories 27b to 27d reaches the predetermined amount, when the updating times reach the given times, the predetermined interval of time, or when a request from the database management nodes 4b to 4d or a command from the external to the external storage unit 9 is inputted. When the database management nodes 4b to 4d refer to the tables 3b to 3d, the external cache control unit 28 operates to read the data into the external caches 27b to 27d allocated to the data areas 10b to 10d where the tables 3b to 3d are stored and then stores the data therein. Then, the external cache control unit 28 causes the external caches 27b to 27d to refer to the database management nodes 4b to 34d.

In this case, the external cache control unit 28 obtains the allocating relation between the database management node and the table stored in the external storage unit 10 by referring to the table information 35. In this embodiment, the table 3d is allocated to the database management node 4d. The table 3c is allocated to the database management nodes 4b and 4c. That is, when the external cache control unit 28 receives an access request from the database management node 4d, the external cache control unit 28 refers to the table information 35 and executes the process based on the access request received about the table 3*d* corresponding with the database management node 4*d*. Further, when the database management nodes 4*b* to 4*d* updates the tables 3*b* to 3*d*, the external cache control unit 28 updates the data held in the external cache memories 27*b* to 27*d* allocated to the data areas 10*b* to 10*d* for storing the tables 3*b* to 3*d*. Hence, any one of the database management nodes 4*b* to 4*d* may refer to and update the data stored in the external cache memories 27*b* to 27*d* if requested. Further, on the predetermined occasion, the external cache control unit 28 updates the data areas 10*b* to 10*d* allocated to the external cache memories 27*b* to 27*d* with the data updated in the external cache memories 27*b* to 27*d*. The database management nodes 4*b* to 4*d* thus do not require control of an output of the updated data to the data areas 10*b* to 10*d*.

In the foregoing second embodiment of the present invention, the database management nodes 4*b* to 4*d* may directly refer to and update the data stored in the external cache memories 27*b* to 27*d* through the external cache control unit 28. Hence, the database management nodes 4*b* to 4*d* does not need to hold the data in the cache of each node. This eliminates the necessity of updating the data stored in the cache memories 8*b* to 8*d* of all the database management nodes 4*b* to 4*d* permitted to refer to the shared table 3*c* to be updated, the update having been executed for synchronous control among the database management nodes 4*b* to 4*d*. Further, it is not necessary to control the database management node 4*c* for actually updating the shared table 3*c* located in the external storage unit 9. The second embodiment of the present invention does not need the foregoing control, which makes it possible to make access to the table more quickly.

Figure 7:
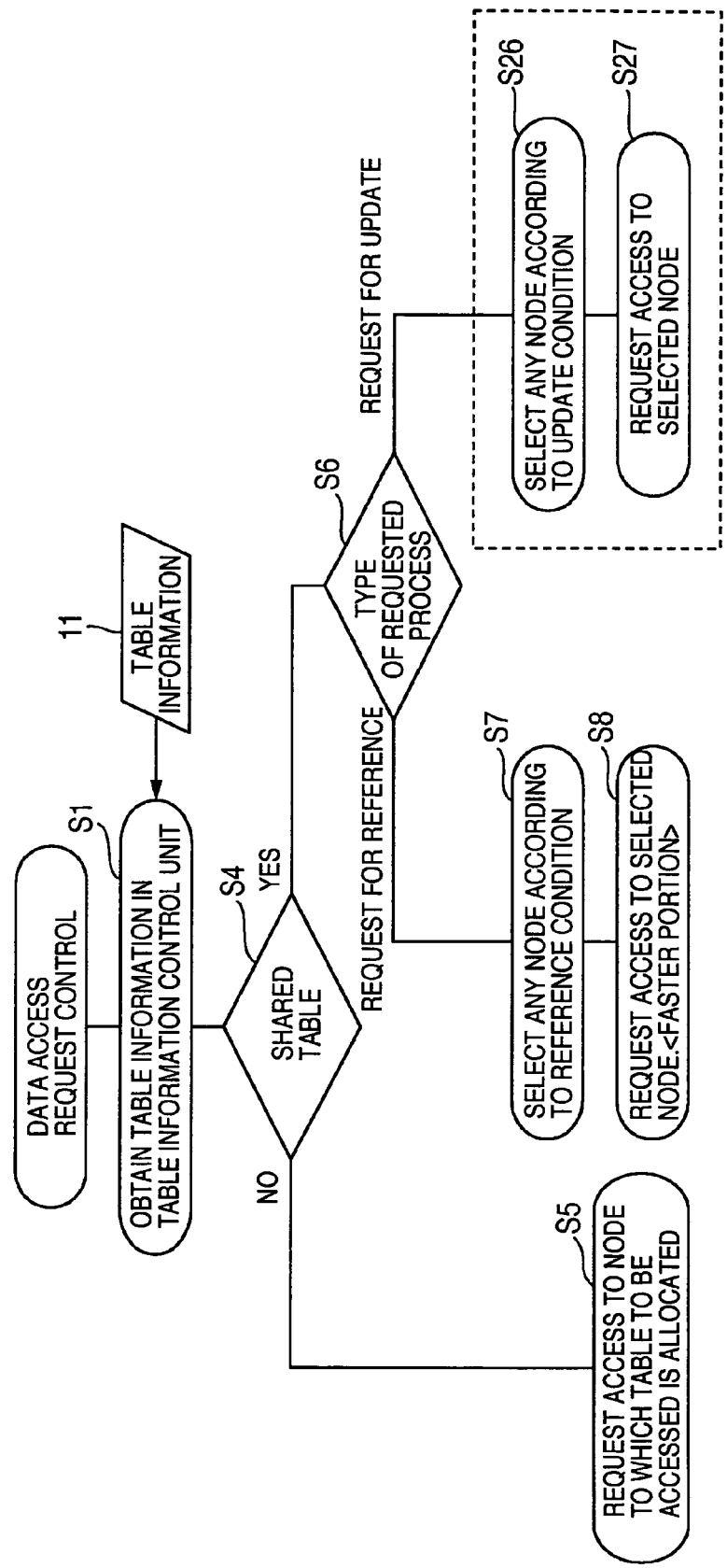
FIG. 7 is a flowchart for illustrating a processing operation of an operating node included in the second embodiment of the present invention.

FIG. 7 is a flowchart for illustrating the operating process of the operating node included in the second embodiment of the present invention. Then, the description will be oriented to the operating process of this node.

In the flow shown in FIG. 7, the process from the steps S1 to S8 is identical with the process from the steps S1 to S8 shown in FIG. 3. In the second embodiment of the present invention, it is not necessary to execute the process of updating the data stored in the cache of every database management node permitted to refer to the shared table 3*c* to be updated, which process has been executed in the process from the steps S9 to S11 having been described in the flow of FIG. 3. Hence, in the case of requesting the update for the shared table 3*c*, the operation is executed to select any database management node for the update process (step S26) and request the data access control unit of the selected database management node to access the shared table 3*c* (step S27).

Figure 8:
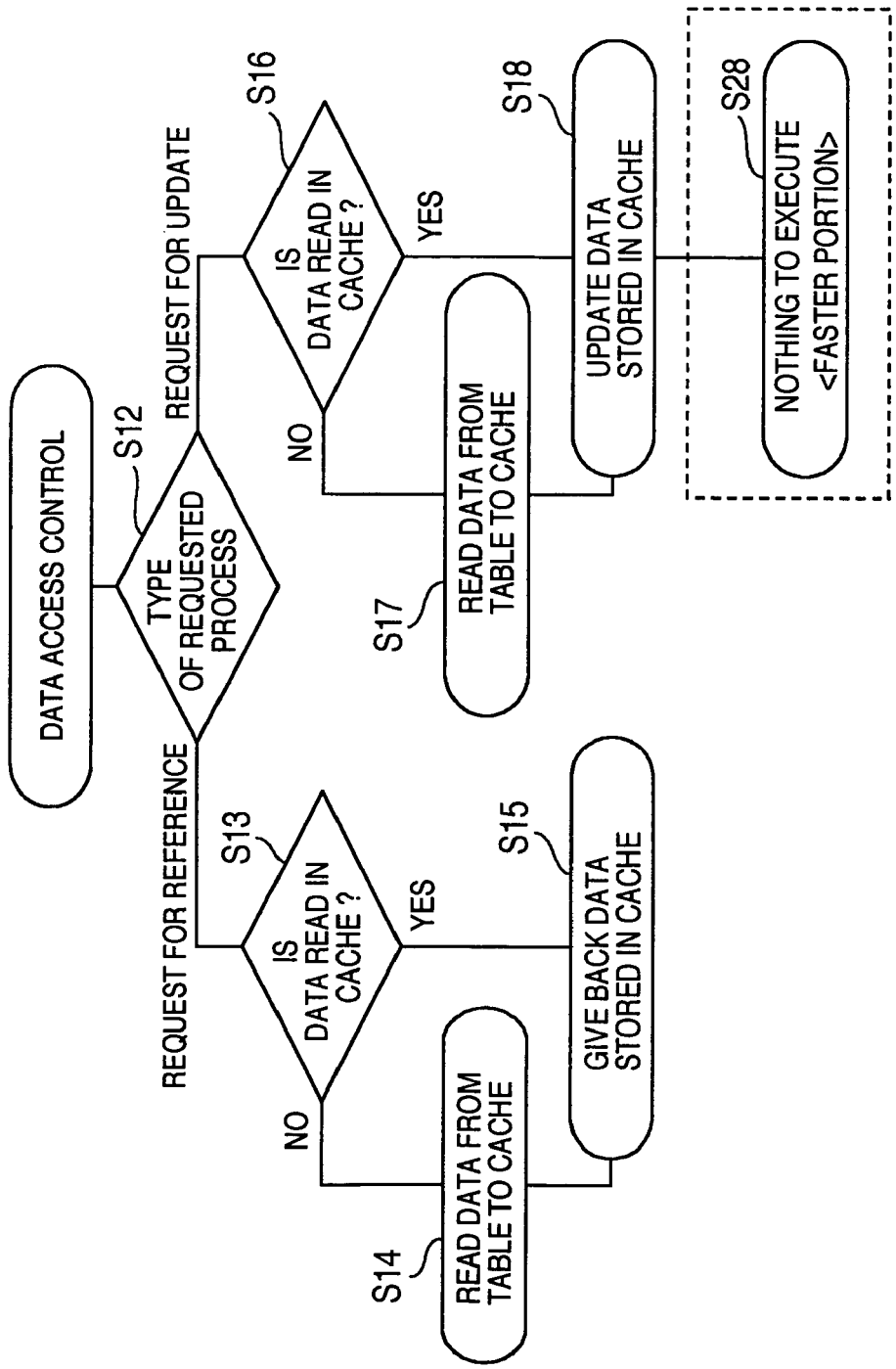
FIG. 8 is a flowchart for illustrating a processing operation of a database management node included in the second embodiment of the present invention.

FIG. 8 is a flowchart for illustrating the operating process of the database management node included in the second embodiment of the present invention. Then, the description will be oriented to the operating process. The process described herein concerns with the process having been described with reference to FIG. 7, concretely, the process of the database management node having accepted an access request.

In the flow of FIG. 8, the process of the steps S12 to S18 is identical with the process of the steps S12 to S18 having been described along the flow of FIG. 4. In the second embodiment of the invention, the system does not need the process of controlling the database management node 4*c* for actually updating the shared table 3*c* located on the external storage unit 9. In the flow of FIG. 4, the process having been executed in the steps S19 to S25. Hence, after the process of the step 18 is executed to update the data stored in the external cache 27*c*, the external cache control unit 28 updates the data area 10*c*. This means that the database management node has nothing to do (step S28).

As described above, according to the second embodiment of the present invention, the system provides a capability of allocating the cache onto each partitioned data area located on the external storage unit and associating the allocated cache with the external storage unit that can be directly controlled by the database management node. This capability makes it possible to execute the application more fast.

As described above, in the first and the second embodiments of the present invention, the load may be distributed by specifying the table with a high reference frequency as the shared table. However, the system is required to search the reference frequency of the table or study the change of the reference frequency as predicating the change of the using status of the table. Further, the system is required to determine if the table is specified as the shared table on the promotional level.

Hence, for the purpose of reducing the burden in the search and study of determining if the table is specified as the shared table, the system may have a capability of monitoring the referring status of the table in the execution of the application and dynamically determining if the table is specified as the shared table.

Figure 9:
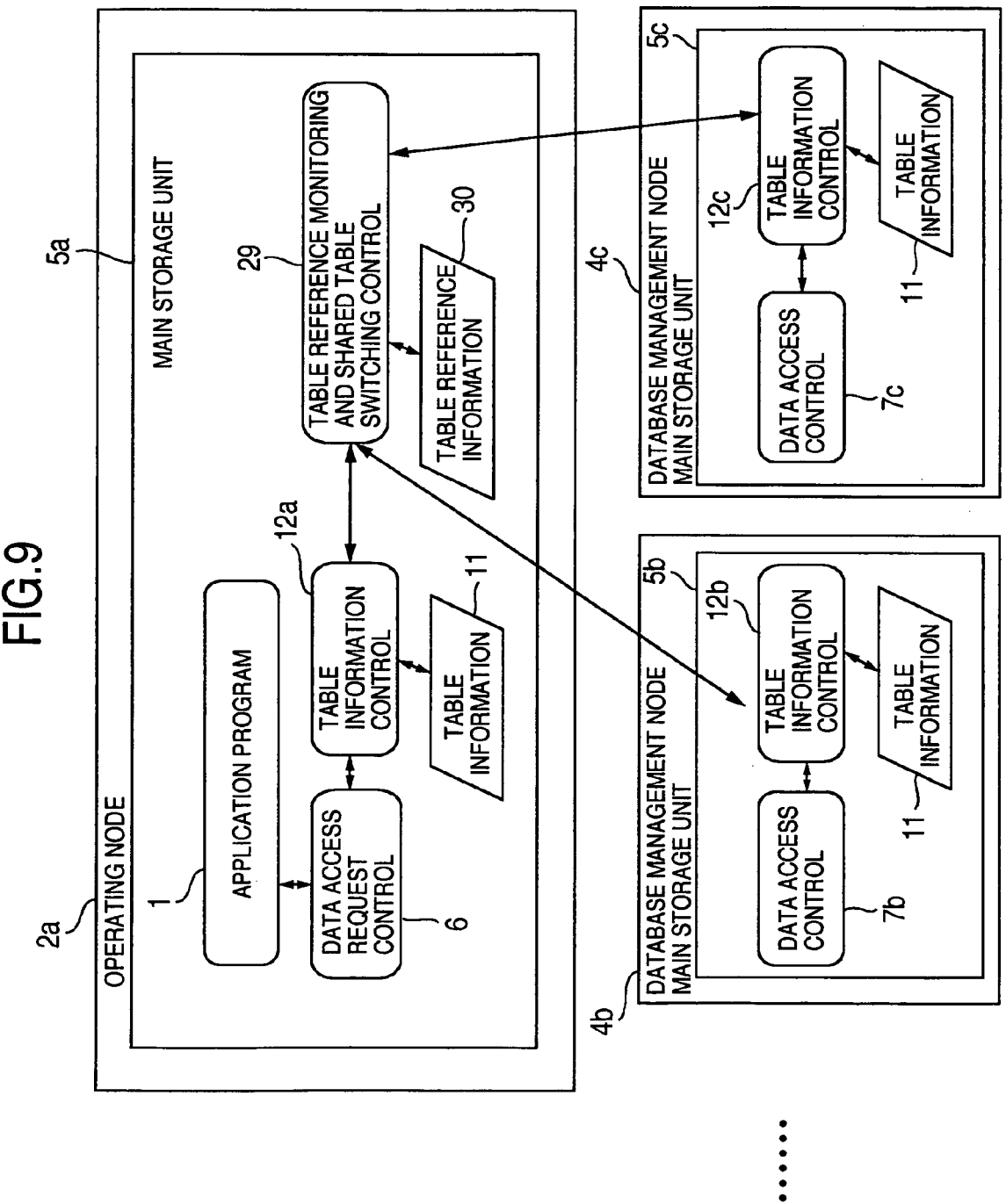
FIG. 9 is a block diagram for explaining a third embodiment of the present invention which is arranged to collect a reference frequency of each table and then to dynamically switch the table into a shared table or vice versa.

FIG. 9 is an explanatory view showing the third embodiment of the present invention which makes it possible to collect a reference frequency of each table and dynamically determine if the table is specified as the shared table according to the reference frequency of the table. Then, the description will be oriented to the third embodiment of the present invention. In FIG. 9, a reference number 29 denotes a table reference monitoring and shared table switching control unit. A reference number 30 denotes table reference information. The other reference numbers indicate the same components as those of FIG. 1. FIG. 9 shows only the portion required for the description herein. The overall arrangement is the same as that shown in FIG. 1 or 6.

In the third embodiment of the present invention shown in FIG. 9, the data management method and system are arranged to add to the operating node 2*a* the table reference monitoring and shared table switching control unit 29 (simply referred to as the monitoring and switching unit) for monitoring the access to the tables 3*b* to 3*d* (FIG. 1 or 6) to be executed by the application 1 of the operating node 2*a*, determining if the table is specified as the shared table, and switching the table into the shared table if specified. When the application 1 requires the access to the tables 3*b* to 3*d*, the data access request control unit 6 inevitably issues the request for referring to the table information 11 to the table information control unit 12*a*. In response, the data access request control unit 6 notifies the monitoring and switching unit 29 of the request for reference. Then, the monitoring and switching unit 29 saves each reference frequency of the tables 3*b* to 3*d* in the table reference information 30.

Figure 10:
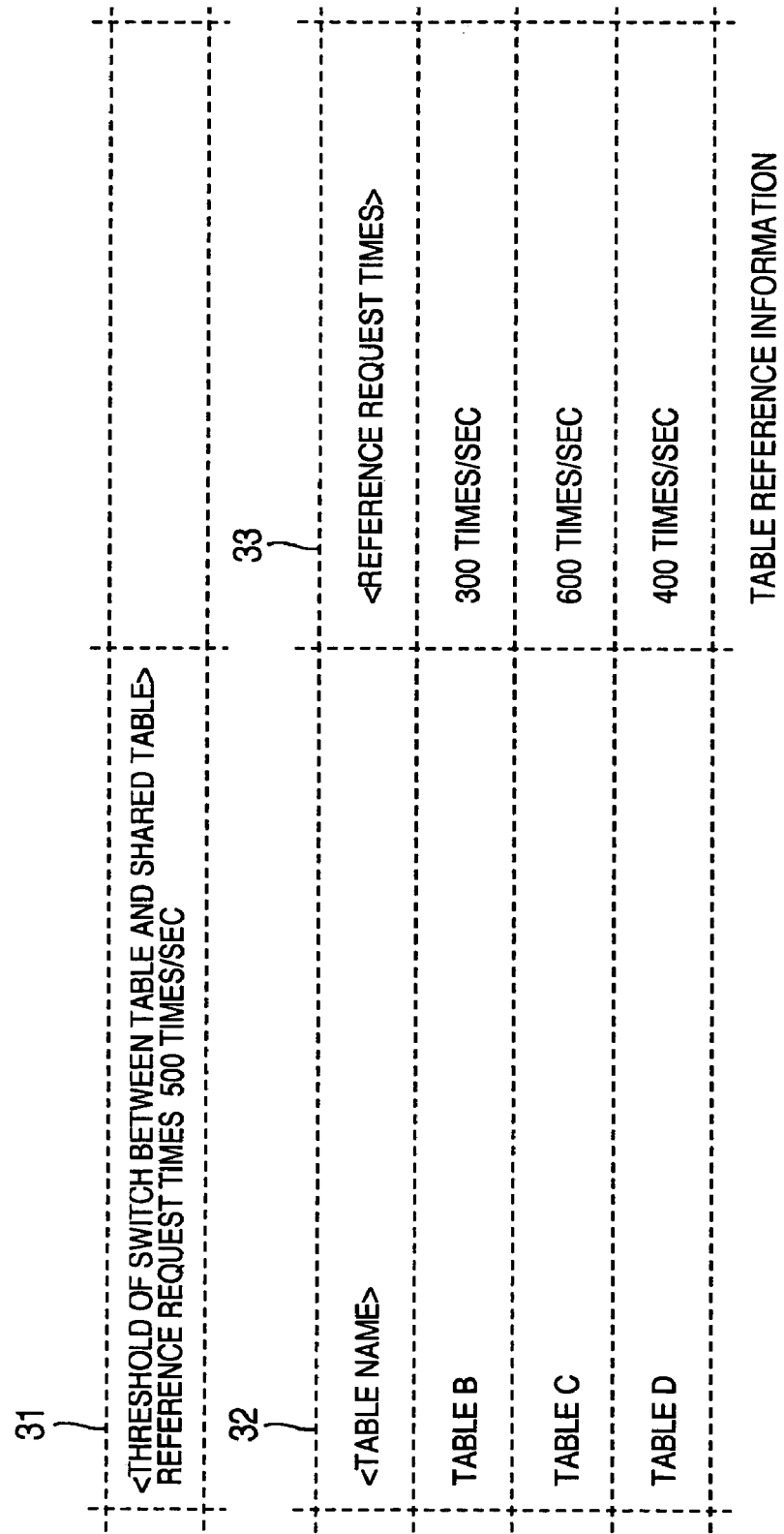
FIG. 10 is a view showing an example of table reference information.

FIG. 10 shows an exemplary composition of the table reference information 30. The table reference information 30 includes a reference frequency threshold value 31 on which the table is switched into the shared table, prespecified by the system or the user, and the reference frequencies 33 of the tables 3*b* to 3*d* with the tale name 32 as a key.

The monitoring and switching unit 29 calculates each reference frequency of the tables 3*b* to 3*d* based on the notice sent from the data access request control unit 6 and occasionally updates the reference frequency information 33 of the tables 3b to 3d of the table reference information 30. Further, the monitoring and switching unit 29 constantly monitors this value. If this value exceeds the threshold value 31 on which each of the tables 3b to 3d is switched into the shared table, the monitoring and switching unit 29 notifies the table information control unit 12a of every node so that the table with the greater value than the threshold value 31 is switched into the shared table, while if the shared table lowers the value, the shared table is switched into the ordinary table. The table information control unit 12a updates the information 14 (FIG. 2) as to whether or not the concerned table name is the shared table in the table information 11 and the reference-permitted database management node(s) 16 (FIG. 2).

In a case that the switch of the table into the shared table is notified to the table information control unit 12a (FIG. 1), the table information control unit 12a operates to specify the information 14 FIG. 2) as to whether or not the concerned table name 13 (FIG. 2) is given to the shared table as YES and then to add to the reference-permitted database management nodes 16 (FIG. 2) the database management node permitted to refer to the shared table. Further, in a case that the switch of the shared table into the ordinary table is notified to the table information control unit 12, the table information control unit 12a operates to specify the information 14 as to whether or not the concerned table name 13 is given to the shared table as NO and then update the reference-permitted database management nodes 16 to only the allocated database management node(s). Later, the access request from the application 1 is made to be the switched table information 11 (FIG. 1) given back from the table information control unit 12a when the data access request control unit 6 determines if the table is the shared table. The table information control 12a is operated according to the switched table information 11.

As described above, according to the third embodiment of the present invention, the data management method and system are arranged to dynamically switch the ordinary table into the shared one or vice versa according to the reference frequency of the table. If the reference frequency of the table is increased, the load is distributed with the table as the shared table. On the other hand, if the reference frequency of the shared table is decreased, the shared table is switched into the ordinary table. This operation makes it possible to eliminate the user's necessity of relocating the table(s) and studying if the table is switched into the shared table according to the using status of the table.

Each process included in each foregoing embodiment of the present invention may be composed of a processing program, which may be supplied as being saved in a recording medium such as a HD (harddisk), a DAT (digital audio tape), a FD (floppy disk), a MO (magneto-optical) disk, a DVD-ROM (digital versatile disk—read-only memory), or a CD-ROM (compact disk—read-only memory).

As described above, the first embodiment of the present invention concerns with the database system in which each of the database management nodes is permitted to make access to only the data area allocated to each node. If the relocation of the table with a high reference frequency is not made possible by division or the like, the table may be specified as the shared table. Hence, any node may make access to the shared table on any timing, so that the performance of the database system may be improved according to the number of the increased nodes.

Moreover, according to the second embodiment of the present invention, the database management method and system are arranged to allocate the cache onto each partitioned data area located on the external storage unit so that the corresponding node may directly control the cache. This thus makes it possible to realize a far faster access to the database.

Moreover, according to the third embodiment of the present invention, the database management method and system are arranged to monitor the referring status of the table by the application and dynamically switch the table into the shared table or vice versa according to the reference frequency of the table. This thus makes it possible to lessen the user's burden in studying the tables for determining if one table is switched to the shared table.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A database management method with selection of a database management node in a database system including an operating node, a plurality of database management nodes, and an external storage unit having data areas, comprising:

arranging each database management node of said plurality of database management nodes;

accessing a table of a database management node by said operating node without saving each reference request frequency of a data area in a reference table at each time referencing data of said data areas from said plurality of database management nodes accessed by said operating node, wherein the table in a data area of a plurality of data areas is allocated to the database management node;

monitoring a referring status of each table of said tables to determine whether said each reference request frequency is greater or smaller than a predetermined threshold value to switch a table in the data area to a shared table or switch said shared table back to an ordinary table in an information table, in said operating node;

in response to an access from an application in said operating node, determining whether or not a target table to be accessed from said application is the shared table based on contents of said reference table, if said target table is not the shared table, issuing an access request to an allocated database management node, and if said target table is the shared table, determining if a process type of said access from said application is a reference or an update, selecting any database management nodes and issuing a request of an access for reference if said process type is the reference, and looping all database management nodes to be referenced to select database management nodes having issued no access request and issuing a request of an access for update if said process type is the update;

determining if a type of a requested process is a reference or an update in a database management node that has been requested for accessing from said operation node, when the type of the requested process is a request for update and if data requested is updated and has been already read in a cache of the database management node, reflecting the requested process of update on data in the cache, and if the data is updated and has not been read in said cache, reading the updated data from the target table or the shared table, saving the updated data in the cache, and reflecting the requested process of update on the undated data saved in the cache;

determining whether or not the target table is the shared table based on said information table,
if the target table is not the shared table, outputting the data updated in the cache to the table of the data area,
otherwise, determining whether or not the database management node is a database management node of the shared table, which is allocated based on said information table,
and if the database management node is not the database management node of the shared table, executing nothing,
otherwise if the database management node is the database management node of the shared table, outputting the data undated in the cache to the data area of said shared table.

2. The database management method as claimed in claim 1, wherein said tables in said data areas allocated to said database management nodes respectively are provided in each of partitioned data areas located on said external storage unit, said cache is allocated to said external storage unit in a manner to correspond with each of said tables, and said cache is controlled by the corresponding database management node.

3. A database system arranged in a shared nothing system in which each database management node of plurality of database management nodes accesses to a table stored in a data area allocated to each database management node executed by a processor, comprising:

an operating node;
a plurality of database management nodes connected to said operating node; and
an external storage unit having data areas;
wherein said operating node comprises:
a data access controller for arranging said each database management node of said plurality of database management nodes;
accessing a table of a database management node by said operating node without saving each reference request frequency of a data area in a reference table at each time referencing data of said data areas from said plurality of database management nodes accessed by said operating node, wherein the table in the data area of a plurality of data areas is allocated to the database management node; and
monitoring a referring status of each table of said tables to determine whether said each reference request frequency is greater or smaller than a predetermined threshold value to switch a table in a data area to a shared table or switch said shared table back to an ordinary table in an information table, in said operating node;
in response to an access from an application in said operating node, determining whether or not a target table to be accessed from said application is the shared table based on contents of said reference table,
if said target table is not the shared table, issuing an access request to an allocated database management node, and
if said target table is the shared table, determining if a process type of said access from said application is a reference or an update;
selecting any database management nodes and issuing a request of an access for reference, if said process type is the reference,
looping all database management nodes to be referenced to select database management nodes having issued no access request, and issuing a request of an access for update, if said process type is the update;
wherein said each database management node of said plurality of database management nodes comprises
a data access controller for determining if a type of a requested process is a reference or an update in a database management node that has been requested for accessing from said operation node;
when the type of the requested process is a request for update and if the data requested to be updated has been read in said cache, reflecting the requested process of update on the data in the cache, and
if the data requested to be updated has not been read in said cache, reading the updated data requested from the target table or the shared table and saving the updated data in the cache, and reflecting the requested process of update on the data saved in the cache;
determining whether or not the target table is the shared table based on said information table,
if the target table is not the shared table based on said information table, outputting the data updated in the cache to be the table of the data area;
otherwise, determining whether or not the database management node is a database management node of the shared table, which is allocated based on said information table, and
if the database management node is not a database management node of the shared table, executing nothing,
otherwise if the database management node is a database management node of the shared table, outputting the data updated in the cache to the data area of said shared table.

4. The database system as claimed in claim 3, wherein said tables stored in said data areas allocated to each of said database management nodes are provided for each of the data areas partitioned on said external storage unit, said cache is allocated to said external storage unit in a manner to correspond with said table, and said cache is controlled by said database management node.

* * * * *